(12) United States Patent
Sommerfeld et al.

(10) Patent No.: US 7,084,367 B2
(45) Date of Patent: Aug. 1, 2006

(54) TEMPERATURE INDICATING CONSUMABLE

(75) Inventors: Troy A. Sommerfeld, Neenah, WI (US); Joseph C. Schneider, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 42 days.

(21) Appl. No.: 10/605,570

(22) Filed: Oct. 9, 2003

(65) Prior Publication Data

US 2005/0077270 A1 Apr. 14, 2005

(51) Int. Cl.
*B23K 10/00* (2006.01)
(52) U.S. Cl. .............................. 219/121.39; 219/121.5; 219/121.48; 219/75
(58) Field of Classification Search ........... 219/121.36, 219/121.5, 121.51, 121.48, 121.59, 74, 75
See application file for complete search history.

(56) References Cited

U.S. PATENT DOCUMENTS

| | | | |
|---|---|---|---|
| 3,773,597 A * | 11/1973 | Captain et al. ............. | 156/499 |
| 4,678,120 A | 7/1987 | Matsuo | |
| 4,861,963 A | 8/1989 | Wallner | |
| 4,928,027 A | 5/1990 | Deininger et al. | |
| 4,960,992 A * | 10/1990 | Vestal et al. ................ | 250/288 |
| 5,266,772 A * | 11/1993 | Reed ....................... | 219/137 R |
| 2002/0043261 A1* | 4/2002 | Leutner et al. .......... | 126/388.1 |

FOREIGN PATENT DOCUMENTS

FR 2836619 A 8/2003

* cited by examiner

*Primary Examiner*—Mark Paschall
(74) *Attorney, Agent, or Firm*—Ziolkowski Patent Solutions Group, SC

(57) ABSTRACT

A method and apparatus for indicating a temperature of a torch consumable is disclosed. The invention includes a shielding cup constructed to be attached to a torch having a coating which indicates a temperature of the shielding cup during a welding/cutting process. Preferably, the coating indicates to a user when the temperature of the torch is beyond a preferred operating range thereby preventing excessive wear of the consumables associated with overheating.

28 Claims, 2 Drawing Sheets

TEMPERATURE INDICATING CONSUMABLE

BACKGROUND OF INVENTION

The present invention relates generally to plasma cutting systems and other high power output welding-type systems such as welding and induction heating systems and, more particularly, to a temperature indicating consumable for use with such systems.

Plasma cutting is a process in which an electric arc is used to cut a workpiece. Plasma cutters typically include a power source, an air supply, and a torch. The torch, or plasma torch, is used to create and maintain the plasma arc that performs the cutting. A plasma cutting power source receives an input voltage from a transmission power line or generator and provides an output voltage to a pair of output terminals, one of which is connected to an electrode and the other of which is connected to the workpiece.

An air supply is used with most plasma cutters to help start the arc, provide the plasma gas to the torch, and cool the torch. A movable or fixed electrode or consumable serves as a cathode and a fixed nozzle serves as an anode. The air supply moves the electrode and as the electrode moves away from the nozzle, it opens the nozzle, and a plasma jet is created. The plasma jet causes the arc to transfer to the work piece, and thus initiates the cutting process. In other plasma cutting systems, a high frequency starter is used to initiate the cutting process.

During the cutting process, as the arc transfers on the plasma from the electrode to the workpiece, heat is generated. The amount of heat generated during operation is partially determined by the type of material being worked, the power output required to work the material, and the type of consumable required to effectuate the desired work. Operating the torch at increased temperatures can effectively shorten the working life of a consumable, and if not addressed, can result in damage to the torch body and/or the power source. Additionally, plasma cutting with an overheated consumable also results in poor cut quality.

It would therefore be desirable to design a consumable which indicates an operating temperature of the consumable.

SUMMARY OF INVENTION

The present invention is directed to a method and apparatus for indicating the temperature of consumables overcoming the aforementioned drawbacks.

A method and apparatus for indicating the temperature of a torch consumable is disclosed. The invention includes a shielding cup constructed to be attached to a plasma torch and constructed to indicate a temperature of the shielding cup during some phase of a welding/cutting process. The coating indicates to a user when the temperature of the consumable is beyond a preferred operating range, thereby preventing excessive wear of the consumables.

Therefore, in accordance with one aspect of the present invention, a shielding cup is disclosed having a body with an outer surface, a first end connectable to a torch, and a second end connectable to a shield. A thermally responsive coating is formed on the shielding cup and provides an indication of the temperature of the shielding cup. As such, an operator is informed that the temperature of the consumable assembly has reached a maximum operating temperature. Such a construction allows an operator to suspend operation prior to thermal damage to the consumables.

In accordance with another aspect of the present invention, a plasma cutter is disclosed that includes a power source configured to condition power into a form usable for a plasma cutting process. A torch is connected to the power source and configured to effectuate the plasma cutting process and includes a shielding cup and a temperature indicator connected thereto. The temperature indicator is configured to indicate a temperature of the shielding cup so that a user can suspend the cutting process before overheating occurs.

According to another aspect of the present invention, a plasma torch consumable kit is disclosed that includes an electrode, a tip, and a shielding cup constructed to provide a temperature indication. Such a kit allows a user to replace a similar consumable with a consumable assembly that includes a temperature indicator.

In accordance with a further aspect of the present invention, a method of manufacturing a plasma torch consumable is disclosed that includes the steps of providing a shielding cup having a body and forming the shielding cup to indicate temperature. Such a construction allows a user to readily observe the point at which the shielding cup has reached a maximum operating temperature.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

The present invention is directed to a temperature indicating consumable. As will be described below, the present invention is directed to a plasma torch consumable set that indicates a temperature to an operator. The temperature that is indicated to the operator is indicative of excessive temperature and is consumable set specific. That is, in a preferred embodiment, one consumable set will operate at one temperature and another consumable set may be constructed to operate at, and indicate, another temperature. One skilled in the art will readily appreciate that indicating an operating temperature of a consumable will be equivalently applicable to other high power output systems such as welding systems and induction heating systems.

Figure 1:
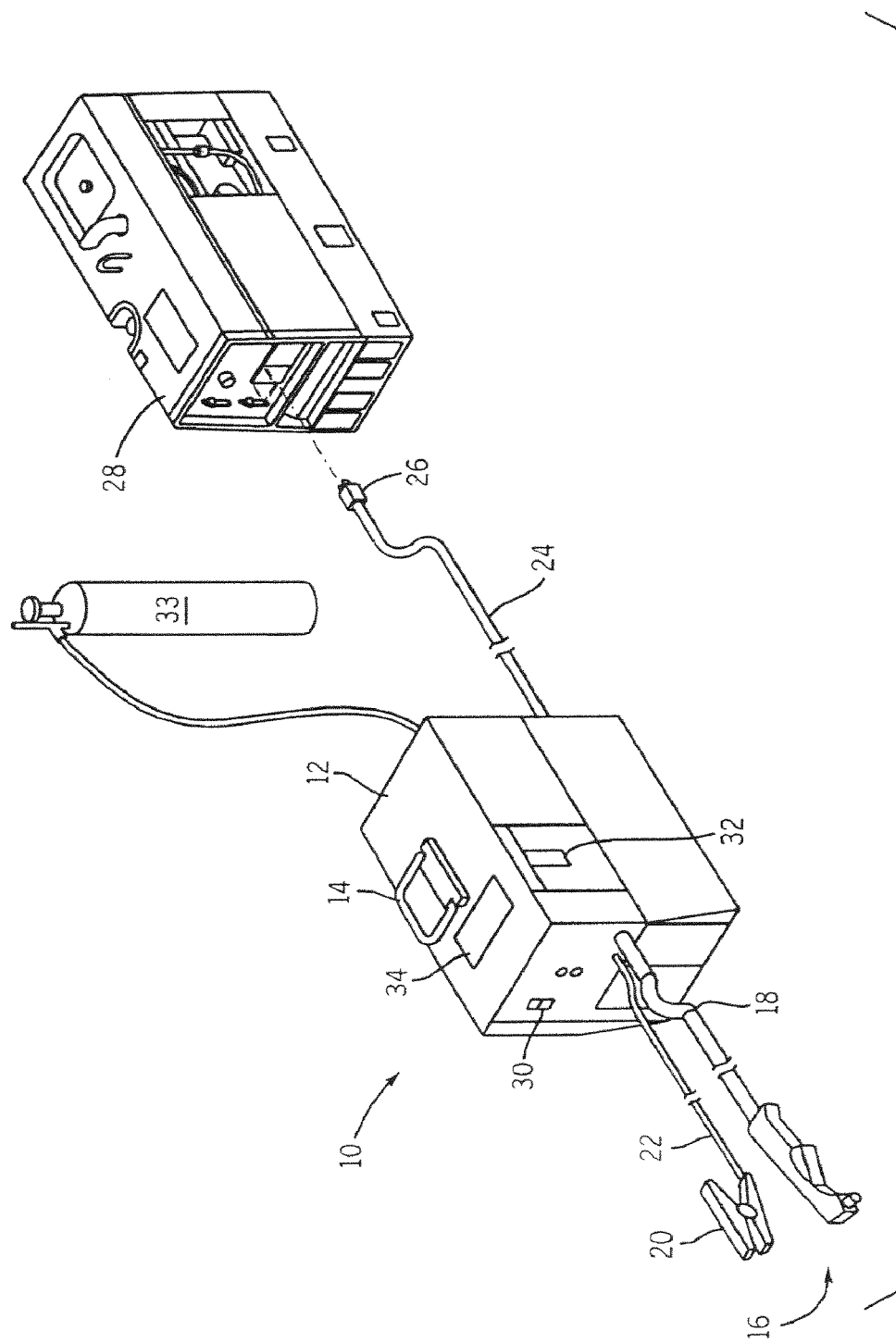
FIG. 1 is a perspective view of one plasma cutting system incorporating the present invention.

Referring to FIG. 1, a plasma cutting system 10 is shown. The plasma cutting system is a high voltage system with maximum open circuit output voltages ranging from approximately 230 Volts Direct Current (VDC) to over 300 VDC. The plasma cutting system 10 includes a power source 12 to condition raw power and regulate/control the cutting process. Specifically, the power source 12 includes a processor that, as will be described, receives operational feedback and controls the plasma cutting system 10 accordingly. Power source 12 includes a lifting means, such as a handle 14 which effectuates transportation from one site to another. Connected to the power source 12 is a torch 16 via cable 18.

The cable 18 provides the torch 16 with power and serves as a communications link between the torch 16 and power source 12.

Also connected to power source 12 is a work clamp 20 which is designed to hold a workpiece (not shown) to be cut and provide a grounding path. Connecting work clamp 20 to the power source 12 is a cable 22 designed to provide a return path for the cutting current from the torch through the workpiece and the work clamp 20. Extending from a rear portion of power source 12 is power cable 24 having plug 26 for connecting the power source 12 to a portable power supply 28 or a transmission power receptacle (not shown). Power source 12 further includes an ON/OFF switch 30.

To effectuate cutting of a workpiece, torch 16 is placed in close proximity to a workpiece connected to clamp 20. A user may then activate a trigger (not shown) on the torch 16 to deliver power to the torch 16 to initiate a pilot arc. Shortly thereafter, a cutting arc is generated and the user may then slowly move the torch across the workpiece to cut the workpiece. The user may adjust the torch speed to reduce spark splatter and provide a more-penetrating cut. Gas is supplied to torch 16 from a pressurized gas source 33 or from an internal air compressor.

Figure 2:
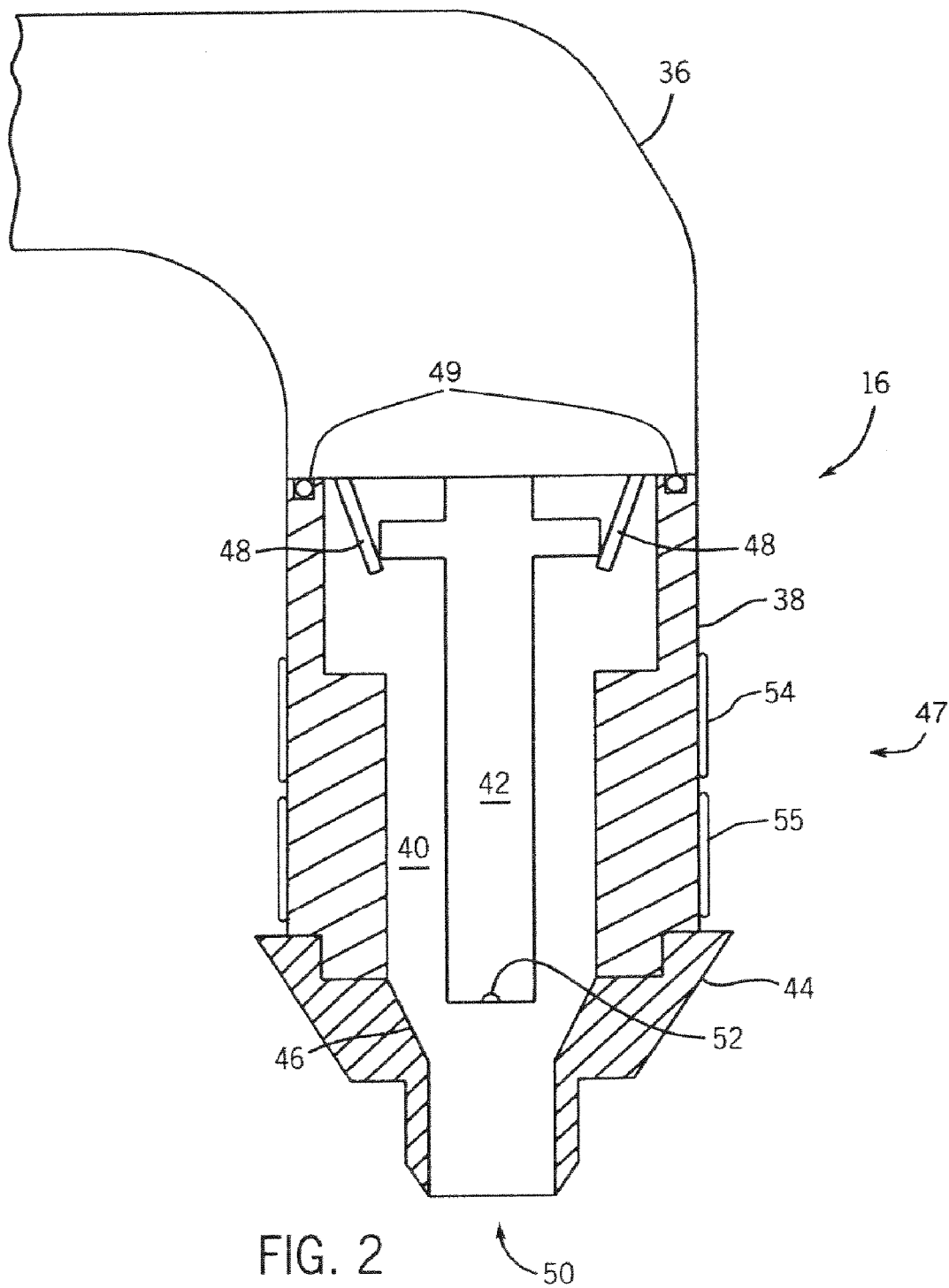
FIG. 2 is a cross-sectional view of a plasma torch consumable constructed in accordance with the present invention.

Referring now to FIG. 2, a cross-section of a plasma cutting torch 16 is shown. Plasma torch 16 is defined by a torch body 36 that is designed to receive a shielding cup 38. Shielding cup 38 is connected to torch body 36 so as to define a gas chamber 40 that, as will be described in greater detail below, allows for the charging of the gas to a plasma and passage of the plasma therethrough. Centrally disposed within gas chamber 40 and connected to torch body 36 is electrode 42. Electrode 42 is removably connected to torch body 36 and is specifically designed for a particular plasma cutting process. Collectively, electrode 42, shielding cup 38, and a tip 44 form a consumable set 47. Torch 16 is constructed such that various consumable sets may be interchangeably connected depending upon the particular plasma cutting process to be carried out. Additionally, it is understood that electrode 42 and tip 44 can be worn, or consumed, at a greater pace than shielding cup 38 so that the shielding cup can be repeatedly used with replacement tips and electrodes before it would require replacement.

Tip 44 is connected to shielding cup 38 and is constructed to form a nozzle 46. In operation, gas is injected into chamber 40 via passages 48 and is superheated to a plasma state. An O-ring 49 forms a seal between shielding cup 38 and torch body 36 and prevents plasma from exiting chamber 40 therebetween. The plasma is forced out of the chamber through nozzle 46 and out of tip 44 via opening or aperture 50. Nozzle 46 is designed to focus the velocity as well as the heat of an arc that is created between a workpiece (not shown) and electrode 42. Electrode 42 is constructed such that the arc extends across an arc path 52 out of the consumable through opening 50.

Torch 16 also includes, preferably, an indicator band 54 formed about shielding cup 38 that is designed to indicate to a user the operating temperature of consumable set 47 connected to torch body 36. The indicator band 54 is designed to glow or change colors in order to provide an operator with an indication that the consumable set has reached a predetermined temperature. The predetermined temperature, the indicated temperature, is the temperature at which further operation of consumable set 47 would result in overheating of consumable set 47. Additionally, it is understood that in the event consumable set 47 is reconfigured to operate at a higher temperature, i.e. by inserting a different electrode or tip, indicator band 54 could also be changed so as to indicate a second operating temperature.

It is equally understood and within the scope of the claims that shielding cup 38 include additional indicator bands such as a second indicator band 55 to indicate a second operating temperature. Such a construction would allow the shielding cup 38 of consumable set 47 to indicate multiple temperatures, such as a first and a second operating temperature. It is also equally understood and within the scope of the claims that indicator bands 54, 55 be configured to indicate temperature in any number of ways including, but not limited to, glowing, changing color, or emitting odor. Such indicators are only by way of example and are not intended to limit the scope of the claims included herein.

Indicator band 54, by being placed directly about shielding cup 38, is closely located to an operator's focus point during operation of the torch. As such, when consumable set 47 reaches a maximum operating temperature, an operator is nearly instantaneously notified of such a condition and can stop the cutting process. Such a construction prevents overheating of the consumable set. Additionally, since cut quality is partially dependent on consumable quality, an operator can maximize the quality of a cut by stopping the cutting process prior to overheating of the consumable set.

As one skilled in the art will fully appreciate, the heretofore description of welding devices not only includes plasma torches, but also includes any system that requires high power outputs, such as heating and cutting systems. Therefore, the present invention is equivalently applicable with any device requiring high power output, including welders, plasma cutters, induction heaters, and the like. Reference to welding power, welding-type power, or welders generally, includes welding, cutting, or heating power. Description of a welding apparatus illustrates just one embodiment in which the present invention may be implemented. The present invention is equivalently applicable with many high power systems, such as cutting and induction heating systems, or any similar systems.

Therefore, in accordance with one embodiment of the present invention, a shielding cup has a body with an outer surface, a first end connectable to a torch, and a second end connectable to a shield. A thermally responsive coating is formed on the shielding cup and provides an indication of the temperature. As such, an operator is informed that the temperature of the consumable assembly has reached a maximum operating temperature. Such a construction allows an operator to suspend operation prior to thermal damage to the consumables.

In accordance with another embodiment of the present invention, a plasma cutter includes a power source configured to condition power into a form usable for a plasma cutting process. A torch is connected to the power source and configured to effectuate the plasma cutting process and includes a shielding cup and a temperature indicator connected thereto. The temperature indicator is configured to indicate a temperature of the shielding cup so that a user can suspend the cutting process before overheating occurs.

According to another embodiment of the present invention, a plasma torch consumable kit includes an electrode, a tip, and a shielding cup constructed to provide a temperature indication. Such a kit allows a user to replace a similar consumable with a consumable assembly that includes a temperature indicator.

In accordance with a further embodiment of the present invention, a method of manufacturing a plasma torch consumable includes the steps of providing a shielding cup having a body and forming the shielding cup to indicate temperature. Such a construction allows a user to readily observe the point at which the shielding cup has reached a maximum operating temperature.

The present invention has been described in terms of the preferred embodiment, and it is recognized that equivalents, alternatives, and modifications, aside from those expressly stated, are possible and within the scope of the appending claims.

The invention claimed is:

1. A shielding cup comprising:
   a body having an outer surface;
   a first end connectable to a torch;
   a second end connectable to a shield; and
   a coating on at least one of the outer surface of the body, the first end, and the second end, the coating being thermally responsive so as to provide an indication of temperature.

2. The shielding cup of claim 1 wherein the coating is further configured to emit an odor to indicate temperature.

3. The shielding cup of claim 1 wherein the coating emits light so as to indicate temperature.

4. The shielding cup of claim 1 wherein the coating changes color so as to indicate temperature.

5. The shielding cup of claim 1 wherein the coating is capable of indicating a range of temperatures.

6. The shielding cup of claim 1 further comprising another coating on a portion of the shielding cup to provide an indication of another temperature.

7. The shielding cup of claim 1 wherein the body further defines a gas chamber configured to support heating of a gas to a plasma state.

8. The shielding cup of claim 1 wherein the gas chamber accommodates an electrode and a cutting tip therein.

9. The shielding cup of claim 1 further comprising a sensor integrally formed with the shielding cup and constructed to communicate with a power source to limit power from the power source if the temperature exceeds a predetermined temperature.

10. A plasma cutter comprising:
    a power source configured to condition power into a form usable for a plasma cutting process;
    a torch connected to the power source and configured to effectuate the plasma cutting process;
    a shielding cup connected to the torch; and
    a temperature indicator configured to indicate a temperature of the shielding cup.

11. The plasma cutter of claim 10 wherein the temperature indicator is one of a coating on the shielding cup, an integral component of the shielding cup, and a sensor about the shielding cup.

12. The plasma cutter of claim 10 wherein the temperature indicator emits an odor so as to indicate temperature.

13. The plasma cutter of claim 10 wherein the temperature indicator changes color so as to indicate temperature.

14. The plasma cutter of claim 10 wherein the temperature indicator emits light so as to indicate temperature.

15. The plasma cutter of claim 10 further comprising a tip and an electrode configured to at least partially pass into the shielding cup.

16. The plasma cutter of claim 10 further comprising a shield attached to an end of the shielding cup.

17. The plasma cutter of claim 10 further comprising another temperature indicator of the shielding cup configured to indicate another temperature of the shielding cup, the another temperature being different from the temperature indicated by the temperature indicator.

18. A plasma torch consumable kit comprising;
    an electrode;
    a tip; and
    a shielding cup constructed with a temperature sensor; the temperature sensor configured to indicate an operating temperature of a plasma torch to provide an indication of a consumable temperature condition to prevent overheating.

19. The kit of claim 18 further comprising a shield connectable to an end of the shielding cup.

20. The kit of claim 18 further comprising an O-ring having a diameter substantially similar to a diameter of the shielding cup and positioned between the shielding cup and a torch body.

21. The kit of claim 18 further comprising a swirl ring constructed to fit within the shielding cup.

22. The kit of claim 18 wherein the shielding cup is constructed to be attached to a plasma torch body.

23. A method of manufacturing a plasma torch consumable comprising the steps of:
    providing a shielding cup having a body; and
    providing a thermal indicator for attachment to the shielding cup, the thermal indicator selected to indicate an operating temperature of the shielding cup.

24. The method of claim 23 wherein the step of providing the thermal indicator for attachment to the shielding cup further comprises applying a temperature indicative coating to an outside surface of the body of the shielding cup.

25. The method of claim 23 further comprising the step of providing an electrode constructed to fit within the body.

26. The method of claim 23 further comprising the step of providing a swirl ring constructed to fit within the body.

27. The method of claim 24 further comprising the step of applying a second temperature indicative coating to the body, wherein the second temperature indicative coating is configured to indicate a second temperature.

28. A method of manufacturing a plasma torch consumable comprising the steps of:
    providing a shielding cup having a body;
    forming the shielding cup; and
    applying a temperature indicative coating to a surface of the body of the shielding cup.

* * * * *